United States Patent [19]
Van Gerwen

[11] Patent Number: 4,768,206
[45] Date of Patent: Aug. 30, 1988

[54] DATA TRANSMISSION SYSTEM

[75] Inventor: Petrus J. Van Gerwen, Eindhoven, Netherlands

[73] Assignee: U.S. Philips Corporation, New York, N.Y.

[21] Appl. No.: 40,529

[22] Filed: Apr. 20, 1987

[30] Foreign Application Priority Data

May 1, 1986 [NL] Netherlands ............... 8601114

[51] Int. Cl.[4] .................. H03K 3/02; H03M 5/20
[52] U.S. Cl. ............................... 375/17; 375/19; 332/9 R; 340/347 DD
[58] Field of Search ............... 360/40, 42, 44, 48; 178/113; 375/17, 19, 37, 55, 60, 18, 20; 332/11 R, 9 R; 340/347 DD

[56] References Cited

U.S. PATENT DOCUMENTS

| | | | |
|---|---|---|---|
| 2,995,618 | 8/1961 | Van Duuren et al. | 375/55 |
| 4,313,203 | 1/1982 | Van Gerwen et al. | 375/17 |
| 4,521,766 | 6/1985 | Vry | 375/17 |

Primary Examiner—Benedict V. Safourek
Attorney, Agent, or Firm—Thomas A. Briody; Jack E. Haken; Anne E. Barschall

[57] ABSTRACT

In DAV (data above voice)-systems an analog speech signal is transmitted in the low-frequency portion of the spectrum of an encoded data signal. When a data signal encoded by the known WAL2 code is used, the high-pass filters, required for the separation of the two signals produce intersymbol interference extending over a large number of bit intervals, requiring complicated equalisers at the receive end for good detection. When encoding the data signal in accordance with the DAV-code, as illustrated in FIG. 2 this drawback is remedied. In addition, this DAV-code is advantageous in that the amplitude fractions, represented by a and b, can basically be chosen at will, allowing the low-frequency content of the code to be affected. When (a; b)=(11/16; 3/16) the encoded data signal can be generated very accurately and in a simple manner.

12 Claims, 8 Drawing Sheets

| $A_4$ $A_3$ | $A_2$ $A_1$ $A_0$ | ROM (dec) $D_5 \ldots D_0$ | $V_{20-1}$ |
|---|---|---|---|
| I { 0 0<br>0 0<br>0 0<br>0 0<br>0 0 | 0 0 0<br>0 0 1<br>0 1 0<br>0 1 1<br>1 0 0 | − 19<br>8<br>22<br>8<br>− 19 | − 1.1875<br>0.5000<br>1.3750<br>0.5000<br>− 1.1875 |
| II { 0 1<br>0 1<br>0 1<br>0 1<br>0 1 | 0 0 0<br>0 0 1<br>0 1 0<br>0 1 1<br>1 0 0 | 13<br>− 14<br>0<br>14<br>− 13 | 0.8125<br>− 0.8750<br>0.0000<br>0.8750<br>− 0.8125 |
| III { 1 0<br>1 0<br>1 0<br>1 0<br>1 0 | 0 0 0<br>0 0 1<br>0 1 0<br>0 1 1<br>1 0 0 | − 13<br>14<br>0<br>− 14<br>13 | − 0.8125<br>0.8750<br>0.0000<br>− 0.8750<br>0.8125 |
| IV { 1 1<br>1 1<br>1 1<br>1 1<br>1 1 | 0 0 0<br>0 0 1<br>0 1 0<br>0 1 1<br>1 0 0 | 19<br>− 8<br>− 22<br>− 8<br>19 | 1.1875<br>− 0.5000<br>− 1.3750<br>− 0.5000<br>1.1875 |

DATA TRANSMISSION SYSTEM

BACKGROUND OF THE INVENTION

1. Field of the Invention

The invention relates to a transmission system comprising a transmitter for transmitting binary data signals via a transmission means of a high-pass nature and a receiver, the transmitter comprising a data source for generating data bits in synchronous consecutive bit intervals having a duration T and a code converter for converting each data bit into a corresponding data symbol, and the receiver comprising a receive filter and a data detector for detecting the transmitted data symbols.

2. Background of the Invention

A similar system is known from U.S. Pat. No. 3,846,583. More specifically, the specification of this patent describes a code for converting data bits into data symbols. The code is designated WAL2 code or Top Hat code. The code results in an improved reduction of low-frequency components in the spectrum of the data symbols, over the biphase code. The data symbols obtained by means of this WAL2 code have a duration T and a form corresponding to a cycle of a square-wave carrier, whose frequency equals the bit frequency of the data signal and whose phase has been shifted through 90° relative to the phase of the bit clock of the data signal.

This WAL2 code can be used for the transmission of binary data signals in mixed systems known as DAV systems (Data Above Voice). In such system, analog information in the form of a speech signal, with relevant additional information such as metering pulses, is transmitted and the frequency range above the band of this analog information is used for transmitting a suitable decoded data signal. However, when applying the WAL2 code, the transmission of the analog information can be disturbed by the low-frequency components of the encoded data signal. The use of high-pass filters of a relatively high cutoff frequency to reduce the disturbing effect of these low-frequency components produces considerable intersymbol interference in the encoded data signal. The intersymbol interference extends over a relatively large number of bit intervals and necessitates complicated adaptive equalisers in the receiver to significantly reduce the disturbing effect on the detection of the data symbols.

SUMMARY OF THE INVENTION

The invention has for its object to provide a novel concept of a code to be used in a transmission system of the type hereinbefore described, offering the possibility of adapting in a simple manner the ratio between the spectral maximum and the size of the low-frequency components of the encoded data signal to the high-pass character of the transmission means, consequently not requiring any complicated equalisers for an optimum detection of the data symbols.

According to the invention, the transmission system is characterized in that the code-converter converts each data bit into a corresponding data symbol of a duration of 2T. The data symbol is composed of five pulses mutually spaced 2T/5 apart, having alternately opposite polarities and equal durations of not more than 2T/2. The amplitudes of the first pair of pulses on either side of the central pulse are equal and amount to to a fraction a of the amplitude of the central pulse. The amplitudes of the second pair of pulses on either side of the first pair of pulses likewise being equal and amounted to a fraction b of the amplitude of the central pulse. The receive filter has a stop band starting at a frequency of approximately 2.25/T. The receiver further comprises an equaliser.

When applying the measures in accordance with the invention, the bandwidth of the main lobe of the spectrum of the encoded data signal is limited to approximately 2.25 times the bit frequency, advantageously resulting in crosstalk-limitation when utilising a wire pair in a telephone cable as part of the transmission means. In addition, the main lobe of the spectrum of the encoded data signal has a double sideband character, reducing the negative effect of the amplitude-versus-frequency characteristic of the telephone cable on the detection of the data symbols. Adapting the present code to the character of the high-pass filters inserted into the transmission means can be achieved in a simple manner by an appropriate choice of the amplitude fractions a and b. Finally, the present code is advantageous in that a simple adaptive decision feedback equaliser will suffice for reducing the disturbing effect of intersymbol interference.

In a first embodiment of the transmission system in accordance with the invention, the relationship between the amplitude fractions a and b has been chosen such that the direct current content of the data symbol virtually equals zero and amplitude fraction b is not smaller than 1/6.

This choice of the amplitude fractions a and b causes a local extremum to occur in the low-frequency portion of the spectrum of the encoded data signal, approximately at the normalised frequency $fT=(5/4\pi)\cdot\arccos[(1+2b)/(8b)]$, having a low value with respect to the maximum normalised at value 1 and likewise a zero point to occur approximately at the normalised frequency $fT=(5/4\pi)\cdot\arccos[(1-2)/(4b)]$. This makes the present code extremely fit for use in those DAV systems, wherein data signals are transmitted at bit rates of the order of magnitude of 100 kbit/s. In addition, in the low-frequency portion of the spectrum of the encoded data signal, an analog signal in the form of a speech signal of 4 kHz bandwidth as well as relevant additional information such as metering pulses are transmitted.

In a second embodiment of the transmission system in accordance with the invention the following condition likewise holds for the amplitude fraction b $$0.1667 \leq b \leq 0.1942.$$

This further condition causes the local extremum to be at least 45 dB below the normalised maximum of the spectrum of the encoded data signal. When applying appropriately dimensioned high-pass filters, a separation amply sufficient in practice can be achieved between the encoded data signal and an analog signal positioned in the low-frequency portion of its spectrum, whilst despite the presence of these high-pass filters the intersymbol interference is limited to a relatively small number of bit intervals.

In an embodiment attractive on grounds of practical usefulness, the following holds for the amplitude fractions a and b: a=11/16 and b=3/16. The advantage of this choice is that the encoded data signal can be generated very accurately in a simple manner by means of a read-only memory (ROM) incorporated in the code converter, which memory needs to contain only 20 memory locations for the storage of signal samples encoded by only 6 bits.

BRIEF DESCRIPTION OF THE DRAWING

The invention will now be further described with reference to the following diagrams, in which corresponding numerals indicate the same elements, wherein:

FIG. 4b shows a table for the explanation of a code converter in accordance with FIG. 4a;

FIG. 6b shows the high-pass characteristic of the filter in accordance with FIG. 6a;

FIG. 7b shows the low-pass characteristic of the filter in accordance with FIG. 7a;

DETAILED DESCRIPTION OF THE PREFERRED EMBODIMENT

Figure 1:
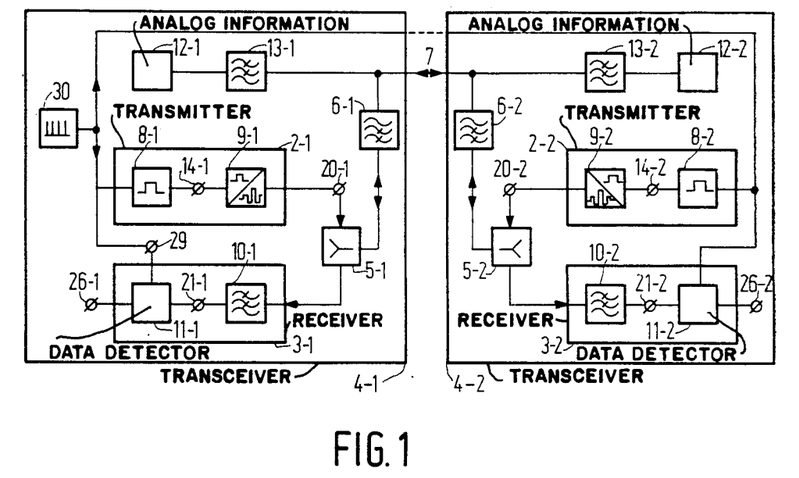
FIG. 1 shows an embodiment of a transmission system in accordance with the invention.

In FIG. 1 a transmission system 1 is depicted comprising transmitters 2-1, 2-2, and receivers 3-1, 3-2, for binary data signal transmission. The transmitter 2-1 and the receiver 3-1, for example, are combined into a transceiver unit 4-1 and connected to a hybrid circuit 5-1. The hybrid circuit 5-1 is connected to a wire pair 7 through a high-pass filter 6-1. The transceiver unit 4-1 is connected to a transceiver unit 4-2 through this wire pair 7, for example, a wire pair in an existing cable as used in telephony. The transceiver unit 4-2 shown comprises the transmitter 2-2 and the receiver 3-2 connected to a hybrid circuit 5-2, which is connected through a high-pass filter 6-2 to the wire pair 7. The transmission means for the binary data signal transmission is in this case formed by the series connection of the following elements: 5-1, 6-1, 7, 6-2, 5-2.

The transmitters 2-1, 2-2, the receivers 3-1, 3-2, the hybrid circuits 5-1, 5-2 and the high-pass filters 6-1, 6-2 for each transceiver unit 4-1, 4-2 have each preferably been designed to be identical. The combination of transmitter 2-1 and receiver 3-2 and the combination of transmitter 2-2 and receiver 3-1, respectively, can each be utilized separately for transmitting and receiving digital signals in a manner still to be disclosed. The transmitter 2-1, 2-2, comprise respective data sources 8-1, 8-2, connected to respective code converters 9-1, 9-2, and the receivers 3-1, 3-2 comprises respective data detectors 11-1, 11-2, connected to respective filters 10-1, 10-2.

The transceiver units shown, 4-1, 4-2, further comprise respective analog information units 12-1, 12-2, connected to respective low-pass filters 13-1, 13-2, The low-pass filters 13-1, 13-2, are connected to the same wire pair 7 to which the high-pass filters 6-1, 6-2, are connected. The analog information units 12-1, 12-2, and the low-pass filters 13-1 and 13-2 have been designed for transmitting and receiving analog information such as for example speech in a known manner, for example from telephony.

In the case of speech in which the significant spectral components in the analog channel are situated below 4 kHz, the low-pass filter 13-1, 13-2, will have a cut-off frequency situated at approximately 4 kHz.

The wire pair 7 is suitable for transmitting analog information in the low-frequency part of its transmission characteristic, which low-frequency part will be called hereinafter the analog channel. Above this low-frequency part a high-frequency part is situated which will be called hereinafter the digital channel and in which digital information can be transmitted. The digital information is generated in the transmitters 2-1, 2-2. Each data source 8-1, 8-2 generates data bits situated in synchronous consecutive bit intervals of a duration of T. A possible data bit series composed of data bits of logic values "1" and "0" is represented in FIG. 3a. In the relevant code-converter 9-1, 9-2, each data bit is converted into a corresponding data symbol having a duration 2T. For example, a data bit of a logic value "1" is encoded in accordance with the data symbol represented in FIG. 2. The data bit of a logic value "0" is thus encoded by the inverse of the data symbol represented in FIG. 2. This data symbol forms part of a class of data symbols wherein each data symbol is composed of five pulses mutually spaced 2T/5 apart, having alternately opposite polarities and each having an equal duration, less than or equal to 2T/5. This data symbol contains a central pulse having a normalised amplitude one, flanked on either side by a first pair of pulses having a polarity opposite to the polarity of the central pulse and an amplitude of a fraction a of the central pulse amplitude. The first pair of pulses is flanked by a second pair of pulses having a polarity corresponding to that of the central pulse and an amplitude of a fraction b of the amplitude of the central pulse.

A code resulting in the data symbols described hereinbefore is indicated by DAV-code in the course of this explanation.

Figure 3A:
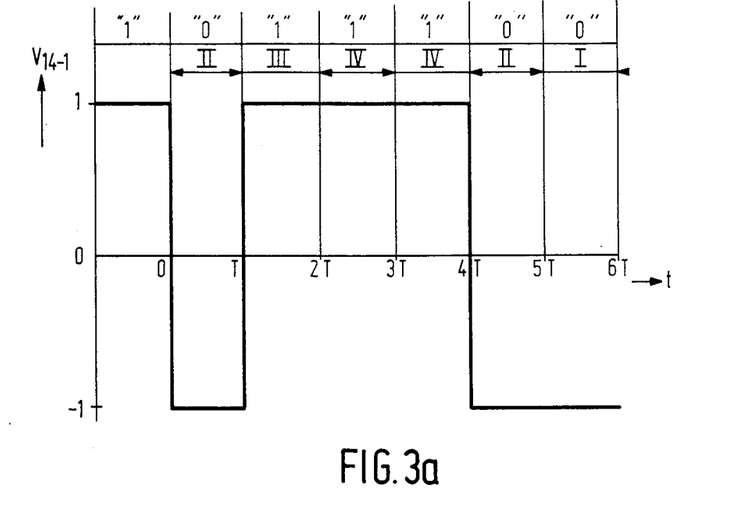
FIG. 3a shows a time function of a series of data bits to be converted.
Figure 3B:
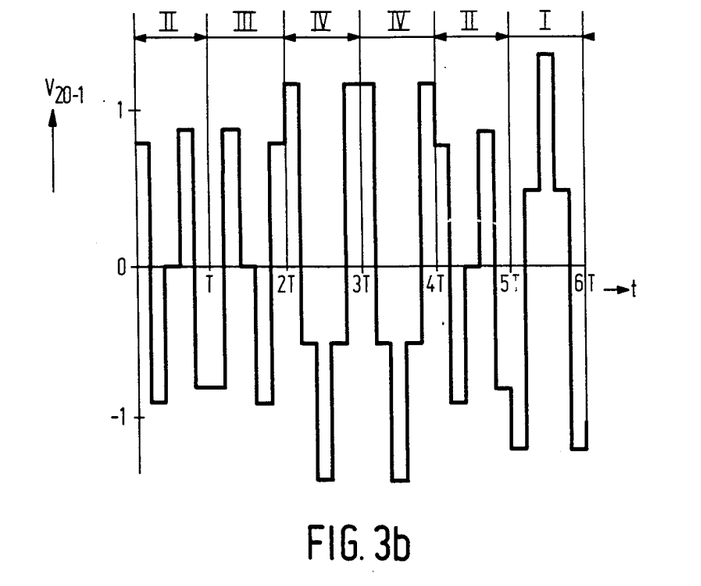
FIG. 3b shows a time function of the data signals of the DAV-converted series of data bits of FIG. 3a, with the amplitude fractions (a; b)=(11/16; 3/16)

In FIG. 3a a possible bit series is represented, which after code-conversion in accordance with the DAV-code results in the encoded data signal represented in FIG. 3b, for the case where the fraction a is equal to 11/16 and the fraction b is equal to 3/16. It should be observed that the instantaneous value of the encoded data signal is always obtained by adding, in a specific bit interval, the value of the data symbol corresponding to a data bit in this bit-interval, to the value which the last preceding data symbol has in this same bit-interval. This is caused by the fact that each data bit is of a duration of T and each data symbol of a duration of 2T, resulting in fold-over of data symbols in the encoded data signal. Thus the instantaneous value in each bit interval of the encoded data signal depends on the combinations of two consecutive data bits. The four possible combinations are represented in FIG. 3a, plotted on the time axis by means of roman numerals I, II, III, and IV, wherein:

I indicates the logic data bit combination "00"
II indicates the logic data bit combination "01"
III Indicates the logic data bit combination "10"
IV indicates the logic data bit combination "11".

The thus obtained encoded data signal is meant to be transferred to the digital channel by, for example, transmitter 2-1, through the hybrid circuit 5-1, the high-pass filter 6-1 and the wire pair 7. As clearly shown in FIG. 3b it can be ascertained ambiguously by determining the sign of the instantaneous value of the encoded signal at the sampling instants nT (n integer) whether a logic "0" or "1" data bit has been generated during the bit interval preceding the relevant sampling instant. Consequently the DAV-code has a binary demodulation at the receive end so that detection can generally remain simple.

In the course of this description only the transceiver unit 4-1 will be described as, basically, its operation and design correspond to the operation and design of the transceiver unit 4-2.

Figure 4A:
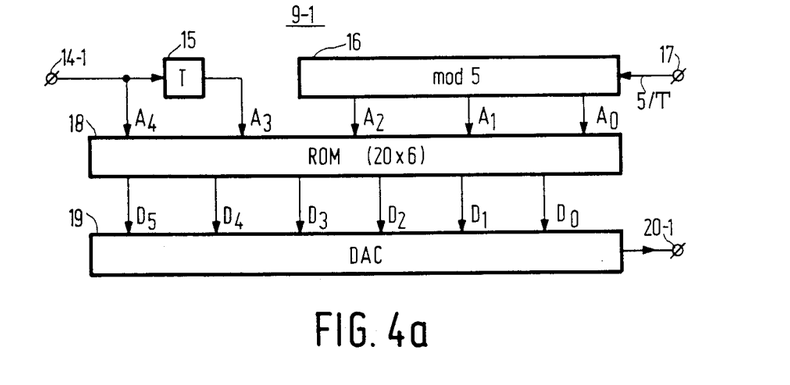
FIG. 4a shows an embodiment of a code converter to be applied in the transmission system in accordance with FIG. 1.

FIG. 4a shows an advantageous embodiment of the code-converter 9-1 comprising a data input 14-1 connected to the data source 8-1. The data-converter 9-1 comprises a delay element 15 connected to the data input 14-1 and imposing a delay on an incoming data bit of a duration of T, a modulo −5 adder 16 comprising an input 17 for connecting an oscillator, not shown in the diagram, which supplies a clock signal of a frequency 5/T, a read memory 18, in the course of this explanation to be referred to as ROM (read only memory) comprising address inputs $A_4$, $A_3$, $A_2$, $A_1$ and $A_0$ and n digital outputs $D_i$ (i=0, 1, ..., n−1) and a digital to-analog converter 19 connected to the digital outputs $D_i$ and a data output 20-1. The address input $A_4$ of the ROM 18 is connected to the data input 14-1, the address input $A_3$ to the output of the delay element 15 and the address inputs $A_2$, $A_1$ and $A_0$ to the three steps of the modulo−5 adder 16.

Figure 4B:
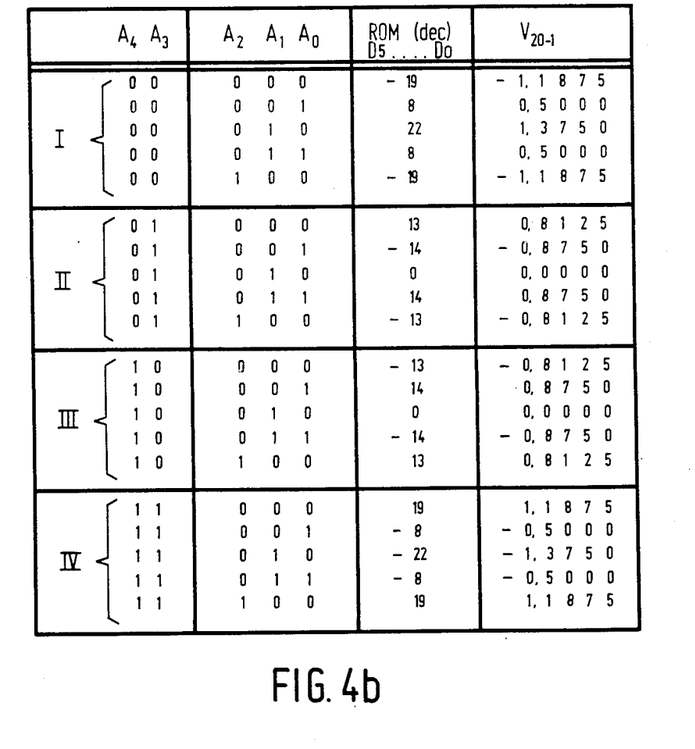

The table represented in FIG. 4b shows in the first column "$A_4A_3$" the logic values of the possible data bit combinations I, II, III and IV (compare FIG. 3a) as applied to the address inputs $A_4$ and $A_3$ of the ROM 18 during a bit interval T. Likewise, column "$A_2A_1A_0$" shows the adder readings of the modulo−5 adding cycle occurring at each of the data bit combinations, I, II, III, IV by way of bit combinations fed to the address inputs $A_2$, $A_1$ and $A_0$ of the ROM 18. The ROM 18 comprises 20 memory locations five of which are read out each time during each bit interval T depending on the data bit combination. After the locations have been read out the instantaneous value of the encoded digital signal stored at the memory location of the address $A_4A_3A_2A_1A_0$ will appear at the outputs $D_i$ (i=0, 1, ..., n−1).

Generally, for arbitrary values of the amplitude fractions a and b the instantaneous amplitude of the encoded data signal contains eleven possible different amplitude values in all, as may be seen from FIG. 3b. Basically, each of the possible amplitude values can be generated at the data output 20-1 by choosing a sufficient number of bits per memory location and likewise choosing a number of inputs of the digital-to-analog converter 19. However, by making the right choice of the amplitude fractions a and b, the number of bits required per memory location as well as the required number of inputs of the digital-to-analog converter 19 can be limited considerably. Such a right choice is for example (a; b)=(11/16; 3/16), in which case the possible amplitude values of the 6-bit encoded data-signal, including the sign bit, can be represented. The outputs required for reading these bits are indicated in FIG. 4a by $D_5$, $D_4$, $D_3$, $D_2$, $D_1$ and $D_0$. Herein $D_5$ represents the output for the sign bit and the remaining five outputs supply the information of the instantaneous amplitude of the encoded data-signal, which information is shown in decimal numerals in column "ROM (Dec) $D_5 \ldots D_o=$". In the event that a code has been chosen for which (a,b)=(11/16; 3/16) holds, this information can be correctly represented by five bits and be digitally generated very accurately by means of a code-converter 9-1 of a simple design. As a result, an attenuation of more than 50 dB can be guaranteed for the spectral components of a frequency in the range from zero to approximately 0.25 times the bit-frequency. Because of the low amplitude of the spectral components in this range, the encoded signal has become substantially insensitive to suppression of the components situated in this low frequency range. When choosing a digital-to-analog converter 19, for which the least significant bit, the decimal unit in the column "ROM (dec) $D_5 \ldots D_o$", corresponds to 62.5 mV, the corresponding instantaneous value of the voltage of the encoded digital signal has been stated in Volts in the column "$V_{20-1}$".

Figure 2:
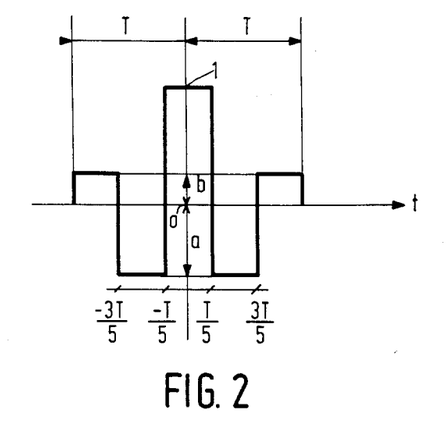
FIG. 2 shows a time function of a data symbol in accordance with the relevant DAV (Data Above Voice) code to be applied in the transmission system in accordance with FIG. 1.

For a data symbol as represented in FIG. 2 having a reference instant t=o in the middle of the central pulse the frequency spectrum, neglecting a constant factor, is given by:

$$C(\omega) = [1 - 2a \cos(2\omega T/5) + 2b \cos(4\omega T/5)](1/\omega) \cdot \sin(\omega T/5) \tag{1}$$

with $\omega = 2\pi f$ and a>0, b>0.

Figure 5A:
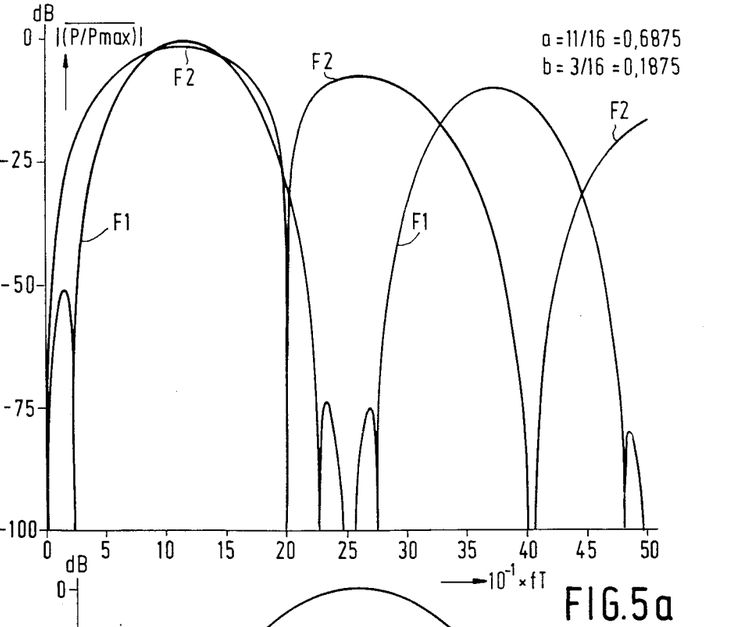
FIG. 5a shows normalised amplitude spectra of the WAL2 code and the DAV code with (a; b)=(11/16; 3/16) plotted as functions of fT at equal mean powers.

The variation of this frequency spectrum depends on the value of the fractions a and b. In the case of a=11/16 and b=3/16 FIG. 5a shows the amplitude spectrum F1 expressed in decibels and normalised with respect to its maximum value represented as a function of fT. For the purpose of comparison—at an equal mean power—the amplitude spectrum F2 of the WAL2-code has been shown.

A comparison between these two spectra shows that the low-frequency content of the amplitude spectrum F1 can be sufficiently small to be applied in DAV-systems, as in this spectrum portion a range can be distinctly recognized in which the analog channel can be accommodated, but, in addition, in which the spectral components, as will further be discussed, have such a low value that they can be suppressed by means of a high-pass filter without thereby causing appreciable deformation of the encoded signal.

The necessary bandwidth of the DAV-code is mainly determined by the main lobe which is limited to approximately 2.25 times the bit frequency 1/T for arbitrary fractions a and b. When utilising a wire pair 7 in a telephone cable in which cross-talk considerably increases at increasing bit frequencies, the limited bandwidth will cause a corresponding limitation of the crosstalk. In practice, the second part of formula (1) not placed in brackets has an effect which can be neglected up to approximately a quarter of the bit frequency. From the fact that this second part of formula (1) can be neglected, it can be derived that in the low portion of the spectrum a local extremum occurs at $$fT = (5/4\pi) \arccos (a/4b) \tag{2}$$

having an extreme absolute value of $$\left| \frac{-a^2 - 8b^2 + 4b}{4b(1 + 2a + 2b)} \right| \tag{3}$$

with respect to the absolute maximum normalised to one. It is generally desired that the frequency component when $\omega = 0$ (the direct-current component) is be absent in the transmitted signal when there are transformer couplings in the cable. When the code has no direct-current content the following holds according to formula (1):

$$1 - 2a + 2b = 0 \tag{4}$$

Formula (2) together with formula (4) transposes into:

$$fT = (5/4\pi) \arccos [(1+2b)/(8b)] \tag{5}$$

for which value the maximum occurs according to formulae (3) and (4) at:

$$\frac{(6b - 1)^2}{32b (1 + 2b)} \tag{6}$$

Figure 5B:
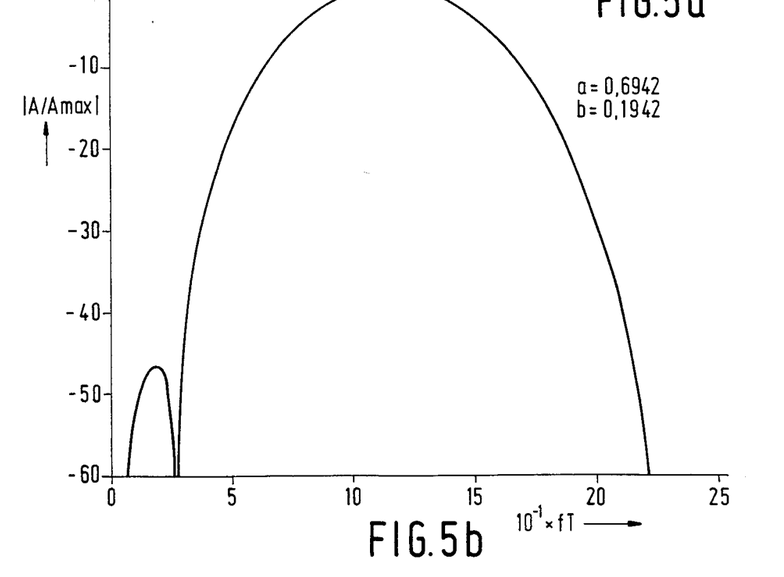
FIGS. 5b to 5d, show main lobes of normalised amplitude spectra of converted signals in accordance with the relevant DAV code with different values of the amplitude fractions a and b, plotted as functions of fT.
Figure 5C:
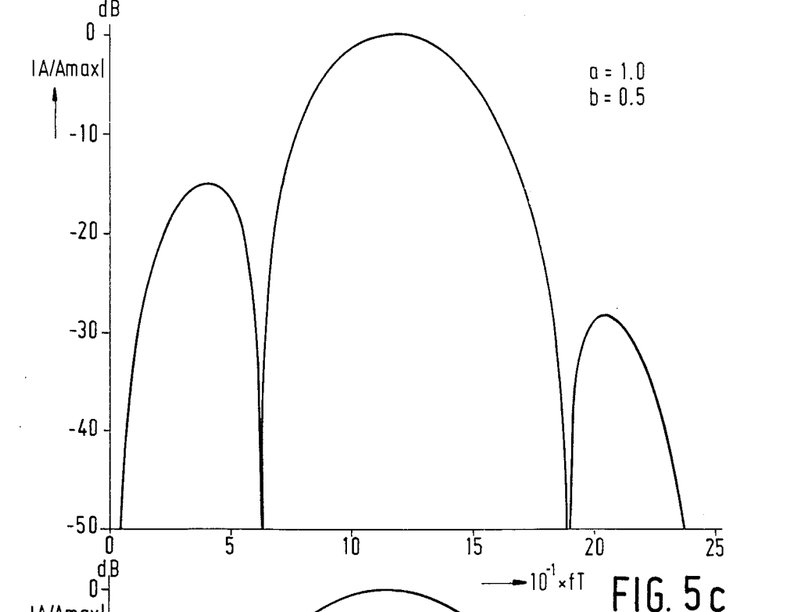
Figure 5D:
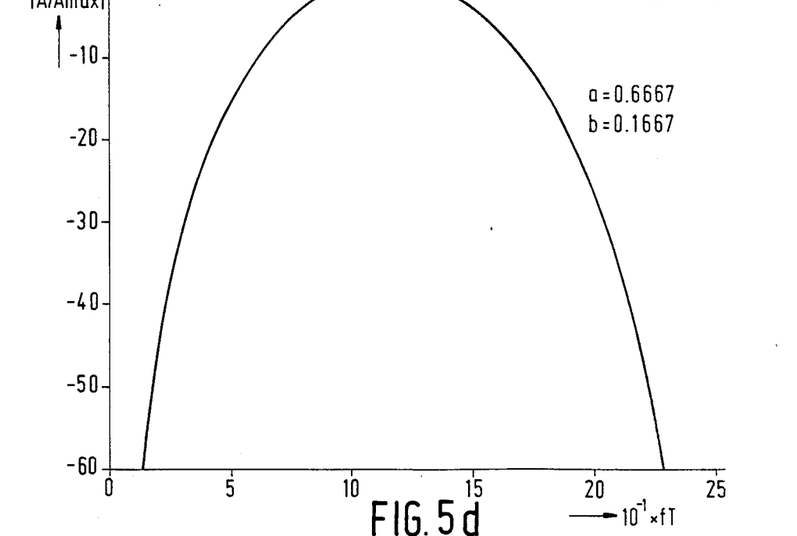

FIGS. 5b, 5c and 5d, respectively, show the main lobe of the normalised value of the amplitude spectrum of DAV-converted signals to approximately 2.25 fT in which the fractions a and b in the aforesaid figures have the following values: (a; b)=(0.6942; 0.1942); (a; b)=(1,0; 0.5) and (a; b)=(0.6667; 0.1667), respectively. In each of these figures the main lobe has a bandwidth limited to approximately 2.25 times the bit frequency 1/T. The values of the fractions a and b determine amongst others the position and the amplitude of the frequency components situated in the low portion of the spectrum as can be seen from the aforesaid formulae. When this code is applied in DAV-systems, the values of a and b can be chosen such that the amplitude of the frequency components in this low portion of the spectrum is small. When these frequency components are suppressed in view of the separation of the analog and digital channels of the DAV systems, high-pass filters with a relatively high cut-off frequency can be utilized for this suppression without leading to intersymbol interference extending over a relatively large number of bit intervals.

More specifically, if in accordance with the DAV-code a data symbol is chosen without a direct current content for which the following condition holds:

$$0.1667 \leq b \leq 0.1942.$$

the absolute value of the first local maximum, reckoned from fT=0 upwards, is at least 45 dB below the normalised maximum. All this can be verified by means of the curves represented in FIGS. 5a, 5b and 5d. The figures show that the analog channel in the low portion of the spectrum can extend for example from O to approximately ¼ of the bit frequency 1/T.

If the condition of formula (4) has been met, it follows from the part of the formula (1) placed in brackets that the spectrum has a zero point where $$fT = (5/4\pi) . \arccos [(1-2b)/(4b)] \tag{7}$$

which zero point for (a; b)=(11/16; 3/16) is situated at fT=0.233.

The DAV-code as represented in FIG. 5a has the advantage of more room in the frequency domain between the first main lobe and the second main lobe of the curve F1, than the room between the corresponding main lobes of the curve F2 for the WAL2 code. When utilising a low-pass filter 10-1 in the receiver 3-1 of the DAV-transmission system 1, a simpler filter will suffice than would have been required with the use of the WAL2 code as a result of more room in the frequency domain.

Figure 6A:
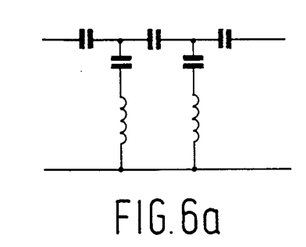
FIG. 6a shows an example of a 5th order Cauer filter for use as a separation filter in the transmission system in accordance with FIG. 1.
Figure 6B:
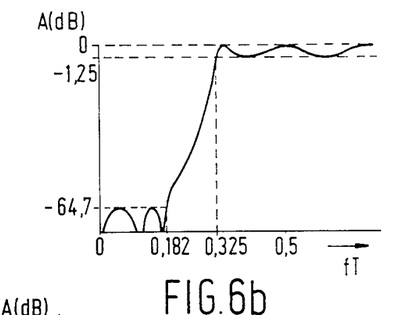

For full-duplex working in the transmission system 1, the hybrid circuit 5-1 is designed in a manner which may be considered known for example from the field of telephony. Between the hybrid circuit 5-1 and the wire pair 7, a high-pass filter 6-1 is inserted mainly allowing the high-frequency part of the DAV line signal to pass. The high-pass filter 6-1 for example can be designed as represented in FIG. 6a and be composed of capacitors and coils. A suitable high-pass filter for example, is a fifth order Cauer filter. The amplitude characteristic of such a filter, for example has a variation (expressed in dB) as a function of fT as represented in FIG. 6b. This variation is substantially independent of the choice of input and output of the filter in accordance with FIG. 6a. Depending on the desired characteristic, the design of the high-pass filter 6-1, the choice of component and the component-value can be determined by means of widely known filter handbooks. The high-pass filter 6-1 showing the amplitude characteristic represented in FIG. 6b is particularly suitable for use with the code in accordance with FIG. 5a where: (a; b)=(11/16; 3/16), because in the range from fT=0.182 to fT=0.325 the aforementioned zero-point is situated at fT=0.233 and the characteristic of the Cauer filter is such that the main lobe is allowed to pass through this filter practically entirely, whilst the low-frequency range to approximately one quarter of the bit-frequency is strongly suppressed to obtain optimum channel separation. As the code hereinbefore explained is virtually insensitive to the cutting-off of the frequency-components situated in the low-frequency part of fT=0 to approximately one quarter of the bit frequency. Also, when using a cascade of two high-pass filters 6-1 and 6-2, with a relatively high cut-off frequency of the pass-band at approximately one third of the bit frequency, the effect of the high-pass filter on the spectrum of the transmitted data symbols will remain limited. Consequently, the intersymbol interference is of a limited nature as well.

In DAV-systems in which high-pass filters 6-1, 6-2 are applied to separate the digital "data" channel electrically from the analog "voice" channel, the digital channel has a predominantly high-pass characteristic. The relevant DAV-code has the potential through the choice of the fractions a and b to lay down more specifically the desire low-frequency behaviour of the code by means of the formulae (1) to (7) hereinbefore discussed. The code is advantageous in that this desired code behaviour and the high-pass character of the digital channel can be adapted to each other to a most favourable degree by selecting fractions a and b. This will further result in a greater freedom of choice of the type of high-pass filters 6-1, 6-2, to be used in the transmission system 1.

A further advantage when using the high-pass filter having an amplitude characteristic as represented in FIG. 6b, is that additional information, above the band of the speech signal occurring in various telephone systems such as metering pulses modulated at a frequency of for example 12 or 16 kHz, is also considerably suppressed in the transmission system 1 at for example 88 kbit/s bit-frequency.

Figure 7A:
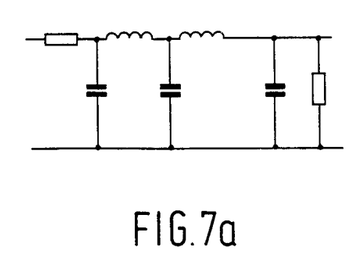
FIG. 7a shows an example of the receive filter to be applied in the transmission system in accordance with FIG. 1.
Figure 7B:
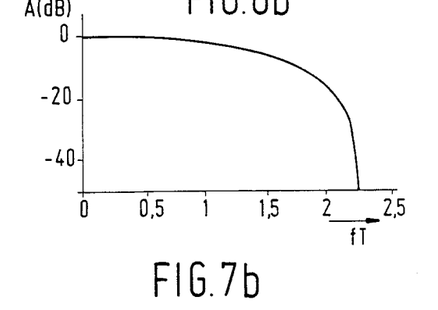

FIG. 7a shows a way in which the receive filters 10-1 and 10-2 can be arranged. These receive filters have the cosine-shaped low-pass characteristic as represented in FIG. 7b, with a stop band commencing at approximately 2.25 times the bit-frequency $1(1/T)$. The high-pass filters 6-1 and 6-2 have the high-pass characteristic as represented in FIG. 6b, the passband of which starts at approximately one third of the bit frequency $(1/T)$. The double sideband character of the main lobe of the spectrum of the encoded data signal at the code-converter 9-1 output, can now clearly be recognized in FIG. 5a. This double sideband character is intensified by applying high-pass filters 6-1, 6-2 and the receive filter 10-2 with characteristics as represented in FIG. 6b and 7b, respectively. In this way, the spectrum of the received data signal at input 21-2 of the data detector 11-2 has two sidebands on either side of the bit frequency $(1/T)$. The two sidebands are substantially equal for a wire pair 7 of limited length, of for example less than 100 m. The attenuation caused by a wire pair 7 of great length, for example 5 km, shows a variation which within the relevant frequency part may be considered as increasing linearly with frequency, as a first approximation. Thus, for relatively great lengths of the wire pair 7 this attenuation does not have any disturbing effect on the signal obtained in the data detector 11-2, after the received data signal has been sampled at the bit frequency $(1/T)$, as this sampling boils down to a double sideband signal demodulation by means of the relevant carrier. The reference signal of a frequency $(1/T)$ required for this sampling can be derived from the received data signal in a simple manner by means of prior art double sideband techniques.

Figure 8:
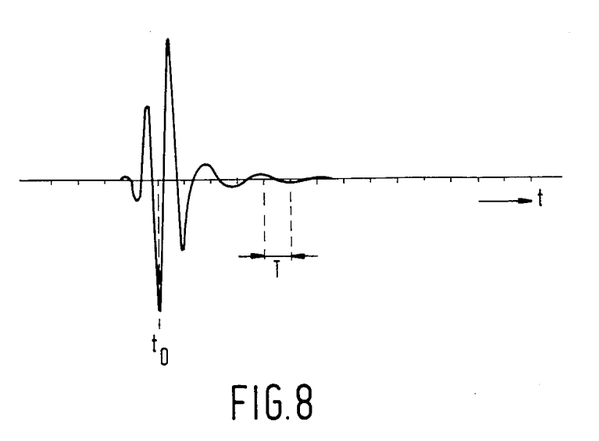
FIG. 8 shows the response of two cascade-connected Cauer filters, having a characteristic in accordance with FIG. 6b, to a data symbol in accordance with the relevant DAV code with (a; b)=(11/16; 3/16)

FIG. 8 shows the response of two cascaded Cauer filters, with an amplitude characteristic as represented in FIG. 6b, to a data symbol in accordance with FIG. 2 with (a; b)=(11/16; 3/16). From FIG. 8, it can be seen that the precursors preceding sampling instants $t_o$, which are important for practical applications, remain of a limited duration of approximately one bit interval. It further can be seen that despite the great attenuation of the high-pass filters 6-1, 6-2 in the relevant low-frequency part, the duration of the response after the sampling instant $t_o$, that is to say the postcursors which are of practical importance, is limited to approximately six bit intervals. This limited deformation can be corrected at the receive end of the transmission system 1 by means of a simple equaliser of the decision feedback type comprising only five taps which will be discussed hereinafter. Even when applying a 5 km wire pair 7, the response remains practically unchanged, though this has not been shown in a diagram.

Figure 9:
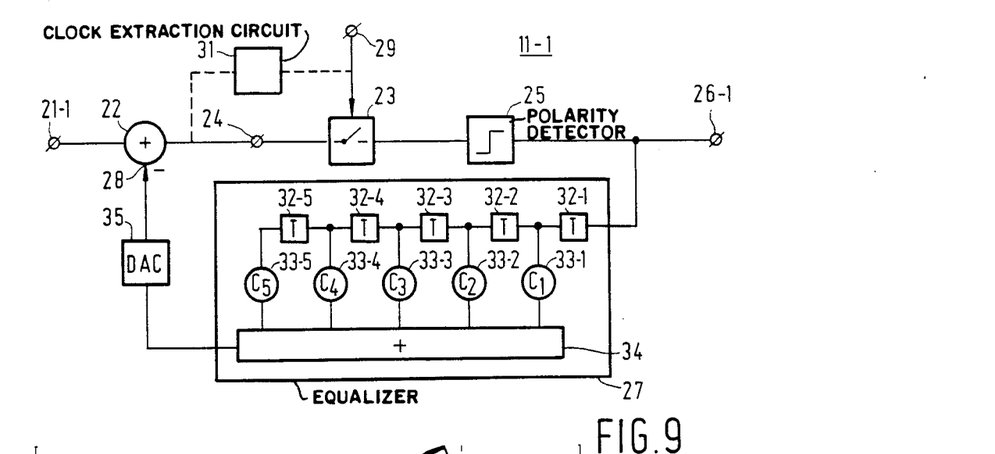
FIG. 9 shows an embodiment of a data detector for use in the transmission system in accordance with FIG. 1.

FIG. 9 shows an embodiment of the data detector 11-1 comprising an input 21-2 connected to the output of the receive filter 10-1 shown in FIG. 1. This detector 11-1 comprises a decision circuit, comprising a cascade of an adder 22 connected to the input 21-1, a sampling circuit 23 connected to the output 24 of adder 22, a polarity detector 25 connected to the output of the sampling circuit 23 for detecting the data bits corresponding to the data symbols and whose output is fed to a data output 26-1 of the detector 11-1 and to an equaliser 27 to generate an equalising signal which is applied to a (−) input 28 of the adder 22. The sampling circuit 23 is connected to a clock signal terminal 29 to which a clock signal is applied which determines the sampling instants $t_o + nT$ (n integer). This clock signal is supplied by a clock signal generator 30 incorporated in the transceiver unit 4-1. For the purpose of synchronisation the clock signal generator 30 is connected to transmitter 2-1 and via a synchronisation channel represented in FIG. 1 by a broken line likewise connected to the transmitter 2-2 and the data detector 11-2. If one wishes the data detector 11-1 to derive its synchronisation information from the transmitted data signal, the clock signal terminal 29 is connected to the output 24 of adder 22 via a clock extraction circuit 31 whose connection is shown in FIG. 9 as a broken line. The equaliser 27 is designed as a digital transversal filter and comprises five cascaded delay elements 32-1 to 32-5 each with a delay T, whose outputs are connected to an adder circuit 34 through five weighting circuits 33-1 to 33-5 with adjustable coefficients C1 to C5. The output of this adder circuit 34 is connected to the (−) input 28 of adder 22 through a digital-to-analog converter 35 for forming the analog equaliser signal. The manner in which the coefficients C1 to C5 are adjusted to minimise the intersymbol interference in dependence on the transmission path and the means used thereto have not been further shown in FIG. 9, as they are widely known and of minor importance to the present invention.

Figure 10A:
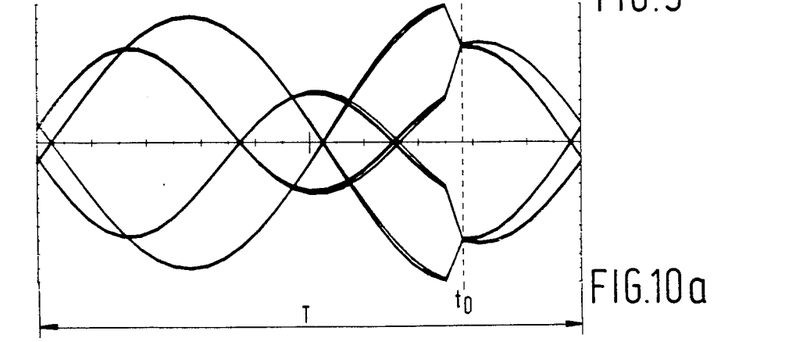
FIGS. 10a to 10e show eye-patterns measured in the data detector in accordance with FIG. 9.
Figure 10B:
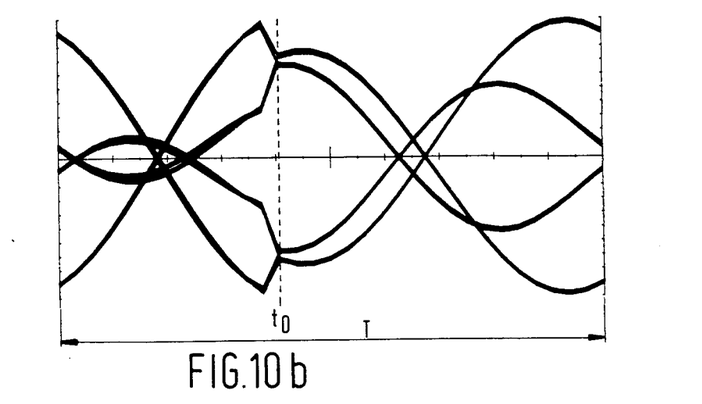
Figure 10C:
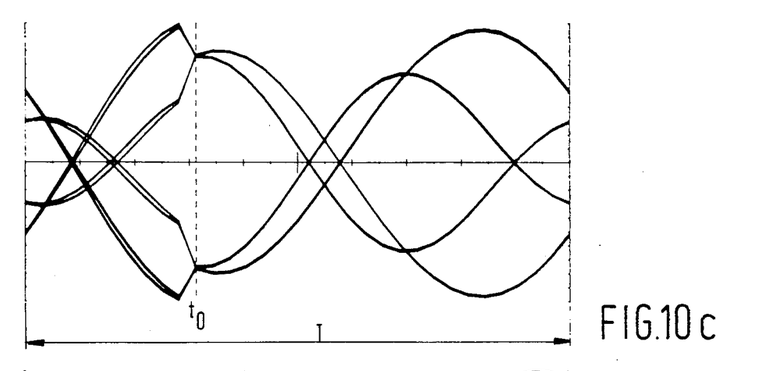

In FIGS. 10a to 10e the eye-patterns are represented measured at the output 24 of adder 22 when applying an equaliser 27 comprising five taps (coefficients C1–C5) and a wire pair 7 in an existing telephone cable. In the depicted eye pattern, the detection instant has been indicated by $t_o$. The FIGS. 10a and 10b have been measured for the case where (a; b)=(11/16; 3/16). FIG. 10 measured without interposition of wire pair 7, shows that a virtually perfect binary detection can be realised. FIG. 10b, measured with a 5 km—long wire pair 7 shows that even at this length a good detection can still be realised. The eye pattern of FIG. 10c has been measured with a 5 km-long-wire pair 7 for the case where (a; b)=(0.6942; 0.1942).

Figure 10D:
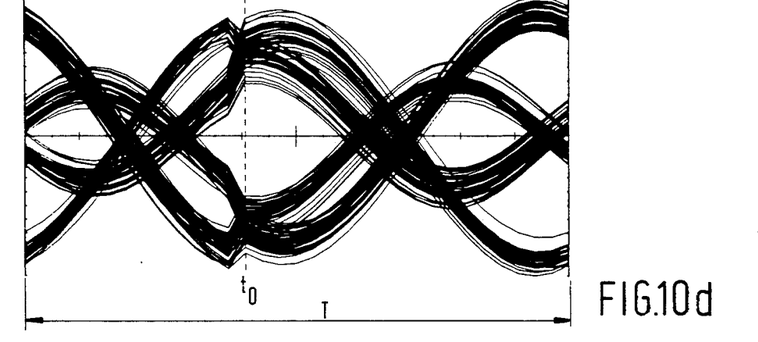
Figure 10E:
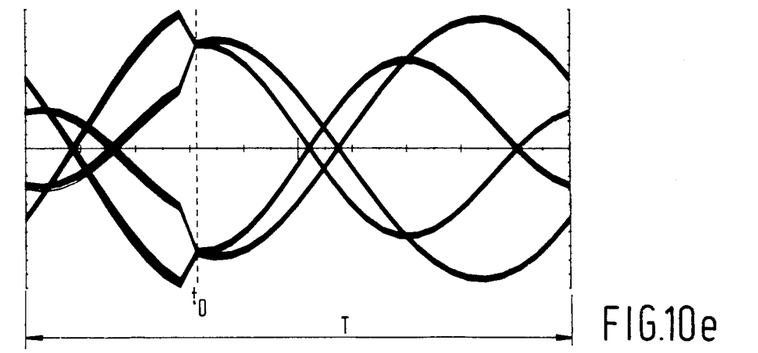

The eye pattern of FIG. 10d has been measured with a 5 km-long wire pair 7 for the case where (a; b)"=(1; ½). As is shown in this case too, a binary detection can be realised. If so desired, in this case the required number of bits per memory location of the ROM 18 (and, consequently, also the required number of inputs of the digital-to-analog converter 19) can be reduced to 3 bits, including the sign bit, as it is easy to recognise that the 7 different amplitude values of the encoded data signal possible now, are each multiples of ½. The eye pattern shown in FIG. 10e has been measured with a 5 km-long wire pair for the case where (a; b)=(0.6667; 0.1667).

The transmission system 1 can be extended if so desired, by echo cancellers known per se for compensating for the disturbing effect of possibly occurring echo, caused by imperfections in the hybrid circuits 5-1 and 5-2 and signal reflections at impedance discontinuities of the transmission means.

What is claimed is:

1. A transmission system comprising:
    (a) a transmitter for transmitting binary data signals via a transmission means of a high-pass nature, the transmitter comprising:
        (i) a data source for generating data bits in synchronous consecutive bit intervals having a duration T; and
        (ii) a code converter for converting each data bit into a corresponding data symbol; and
    (b) a receiver comprising:
        (i) a receive filter; and
        (ii) a data detector for detecting the transmitted data symbols;
    wherein the improvement comprises that;
    (c) the code-converter is arranged to convert each data bit into a corresponding data symbol having a duration 2T, the data symbol being composed of five pulses spaced 2T/5 apart having alternately opposite polarities and equal durations of not more than 2T/5, amplitudes of a first pair of pulses on either side of a central pulse being equal and being a times an amplitude of the central pulse, where a is a factor $\leq 1$, and amplitudes of a second pair of pulses on either side of the first pair of pulses being equal and being b times the amplitude of the central pulse where b is a factor $\leq 1$;
    (d) the receive filter has a cut-off frequency of approximately 2.25T; and
    (e) the receiver further comprises an equalizer.

2. A transmission system comprising:
    (a) a transmitter for transmitting binary data signals via a high-pass transmission means, the transmitter comprising:
        (i) a data source for generating data bits in synchronous consecutive bit intervals having a duration T; and
        (ii) a code converter for converting each data bit into a corresponding data symbol of duration 2T, the data symbol being composed of first, second, third, fourth, and fifth pulses, each pulse being of equal pulse duration, said pulse duration being not more than 2T/5, said pulses being equally spaced, so that sequential pulses are 2T/5 apart, and said pulses being of alternately opposite polarities, said third pulse being a central pulse having an amplitude, said second and fourth pulses forming a first pair of pulses on either side of the central pulse, said first pair of pulses having equal amplitudes which are a factor of a times the amplitude of the central pulse, where a is a number less than or equal to one, the first and fifth pulses forming a second pair of pulses on either side of the first pair of pulses, the second pair of pulses having equal amplitudes which are a factor of b times the amplitude of the central pulse, where b is a number less than or equal to one, whereby transmitted data symbols overlap to form a multi-level transmission signal; and
    (b) a receiver comprising:
        (i) a receive filter, having a cutoff frequency of approximately 2.25/T;
        (ii) a data detector for detecting the transmitted data symbols; and
        (iii) an equalizer coupled to the data detector for minimizing intersymbol interference.

3. A transmission system as claimed in claim 1 or 2, wherein a and b are chosen such that the direct current content of signals output by the transmitter substantially equals zero and the factor b is not smaller than 1/6.

4. A transmission system as claimed in claim 3, wherein $0.1667 \leq b \leq 0.1942$.

5. A transmission system as claimed in claim 4, wherein $a = 11/16$ and $b = 3/16$.

6. A transmission system as claimed in claim 1 or 2, wherein the code converter comprises:
    (a) a delay element coupled to receive and delay the data bits and producing a delay T;
    (b) a modulo-5 adder having a clock input for receiving a clock signal of frequency 5/T synchronous with the data bits;
    (c) a read only memory having five address inputs, the two most significant inputs being connected to an input and output of the delay element and the three remaining inputs being connected to outputs of the modulo-5 adder; and
    (d) a digital-to-analog converter connected to outputs of the read only memory for generating the data symbols to be transmitted.

7. A transmission system as claimed in claim 1 or 2, wherein the receive filter is a low-pass filter with a cosine-shaped frequency response and a passband extending over a frequency range from 0.25/T.

8. A transmission system as claimed in claim 1 or 2, wherein the equaliser is incorporated in a feedback circuit of the data detector and comprises:
    (a) a transversal filter with five cascaded delay elements, each producing a delay T;
    (b) five weighting circuits having adjustable coefficients; and
    (c) adder circuit, coupled to outputs of the delay elements via the weighting circuits, for generating an equalising signal for the detector.

9. The system of claim 2 wherein the values a, b, and the amplitude of the central pulse are all distinct from one another, whereby the multi-level transmission signal has eleven amplitude levels.

10. A code converter for use in a high-pass transmission means, which transmits binary signals, comprising:
    (a) an input for receiving data bits in synchronous consecutive bit intervals of duration T;
    (b) means for converting each data bit into a corresponding data symbol of duration 2T, the data symbol being composed of first, second, third, fourth, and fifth pulses, each pulse being of equal pulse duration, said pulse duration being not more than 2T/5, said pulses being equally spaced, so that sequential pulses are 2T/5 apart, and said pulses being of alternately opposite polarities, said third pulse being a central pulse having an amplitude, said second and fourth pulses forming a first pair of pulses on either side of the central pulse, said first pair of pulses having equal amplitudes which are a factor of a times the amplitude of the central pulse, where a is a number less than or equal to one, the first and fifth pulses forming a second pair of pulses on either side of the first pair of pulses, the second pair of pulses having equal amplitudes which are a factor of b times the amplitude of the central pulse, where b is a number less than or equal to one;

(c) an output at which said data symbol is provided.

11. A receiver for receiving data symbols representing binary data signals, including data bits having consecutive bit intervals of duration T, the receiver comprising:
 (a) an input for receiving data symbols which are composed of first, second, third, fourth, and fifth pulses, each pulse being of equal pulse duration, said pulse duration being not more than 2T/5, said pulses being equally spaced, so that sequential pulses are 2T/5 apart, and said pulses being of alternately opposite polarities, said third pulse being a central pulse having an amplitude, said second and fourth pulses forming a first pair of pulses on either side of the central pulse, said first pair of pulses having equal amplitudes which are a factor of a times the amplitude of the central pulse, where a is a number less than or equal to one, the first and fifth pulses forming a second pair of pulses on either side of the first pair of pulses, the second pair of pulses having equal amplitudes which are a factor of b times the amplitude of the central pulse, where b is a number less than or equal to one;
 (b) a receive filter coupled to the input and having a cutoff frequency of approximately 2.25/T;
 (c) a data detector coupled to an output of the receive filter for detecting the data symbols; and
 (d) an equalizer coupled to the data detector for minimizing intersymbol interference.

12. A transmitter including high-pass transmission means for transmitting binary data signals, the transmitter comprising:
 (a) a data source for generating data bits in synchronous consecutive bit intervals having a duration T;
 (b) a code converter for converting each data bit into a corresponding data symbol of duration 2T, the data symbol being composed of first, second, third, fourth, and fifth pulses, each pulse being of equal pulse duration, said pulse duration being not more than 2T/5, said pulses being equally spaced, so that sequential pulses are 2T/5 apart, and said pulses being of alternately opposite polarities, said third pulse being a central pulse having an amplitude, said second and fourth pulses forming a first pair of pulses on either side of the central pulse, said first pair of pulses having equal amplitudes which are a factor of a times the amplitude of the central pulse, where a is a number less than or equal to one, the first and fifth pulses forming a second pair of pulses on either side of the first pair of pulses, the second pair of pulses having equal amplitudes which are a factor of b times the amplitude of the central pulse, where b is a number less than or equal to one.

* * * * *